US008865929B2

(12) United States Patent
Xu et al.

(10) Patent No.: US 8,865,929 B2
(45) Date of Patent: Oct. 21, 2014

(54) REACTIVE DYES FOR CONTACT LENSES

(75) Inventors: Yuan Xu, Fremont, CA (US); Charlie Chen, San Ramon, CA (US); Charles A. Francis, Union City, CA (US); Shane Mao, San Ramon, CA (US); Hong Xue, Pleasanton, CA (US); Xining Zhang, Union City, CA (US)

(73) Assignee: CooperVision International Holding Company, LP, St. Michael (BB)

( * ) Notice: Subject to any disclaimer, the term of this patent is extended or adjusted under 35 U.S.C. 154(b) by 0 days.

(21) Appl. No.: 14/131,915

(22) PCT Filed: Jul. 17, 2012

(86) PCT No.: PCT/US2012/047014
§ 371 (c)(1),
(2), (4) Date: Mar. 25, 2014

(87) PCT Pub. No.: WO2013/012839
PCT Pub. Date: Jan. 24, 2013

(65) Prior Publication Data
US 2014/0200287 A1 Jul. 17, 2014

Related U.S. Application Data

(60) Provisional application No. 61/509,388, filed on Jul. 19, 2011.

(51) Int. Cl.
| | | |
|---|---|---|
| C09B 62/465 | (2006.01) | |
| C09B 1/34 | (2006.01) | |
| G02B 1/04 | (2006.01) | |
| C09B 62/80 | (2006.01) | |
| C09B 69/10 | (2006.01) | |
| C09B 1/16 | (2006.01) | |

(52) U.S. Cl.
CPC ............. *C09B 1/343* (2013.01); *G02B 1/043* (2013.01); *C09B 62/80* (2013.01); *C09B 1/34* (2013.01); *C09B 69/101* (2013.01); *C09B 1/16* (2013.01)
USPC ............ 558/46; 558/47; 523/106; 523/107; 526/279

(58) Field of Classification Search
None
See application file for complete search history.

(56) References Cited

U.S. PATENT DOCUMENTS

| | | | |
|---|---|---|---|
| 4,132,841 A * | 1/1979 | Champenois | 526/221 |
| 4,468,229 A | 8/1984 | Su | |
| 4,559,059 A | 12/1985 | Su | |
| 5,286,803 A * | 2/1994 | Lindsay et al. | 525/329.7 |
| 5,470,932 A | 11/1995 | Jinkerson | |
| 5,944,853 A | 8/1999 | Molock et al. | |
| 5,999,886 A * | 12/1999 | Martin et al. | 702/31 |
| 6,149,692 A | 11/2000 | Lally et al. | |
| 6,310,215 B1 | 10/2001 | Iwamoto | |
| 7,216,975 B2 | 5/2007 | Hong | |
| 7,659,325 B2 | 2/2010 | Hagting et al. | |
| 7,662,397 B2 * | 2/2010 | Krempl et al. | 424/211.1 |
| 8,262,948 B2 * | 9/2012 | Laredo et al. | 252/586 |
| 2005/0251929 A1 | 11/2005 | Hong | |
| 2005/0272833 A1 | 12/2005 | Doshi | |
| 2006/0252844 A1 | 11/2006 | Mentak | |
| 2007/0013869 A1 | 1/2007 | Dahi et al. | |
| 2011/0092659 A1 * | 4/2011 | McKenna et al. | 526/264 |

FOREIGN PATENT DOCUMENTS

| | | | |
|---|---|---|---|
| EP | 1293541 | * | 3/2003 |
| WO | WO 2009/036903 | * | 3/2009 |

OTHER PUBLICATIONS

Data sheet for benzoyl chloride obtained from Chemical Book online (no date).*
Abstract for RU 2281305 (Oct. 2006).*
International Search Report and Written Opinion issued in corresponding International Patent Application No. PCT/US2012/047014 dated Sep. 21, 2012 (14 pages).

* cited by examiner

*Primary Examiner* — Marc Zimmer
(74) *Attorney, Agent, or Firm* — Kilyk & Bowersox, P.L.L.C.

(57) ABSTRACT

A method for preparing a polymerizable monomer-dye compound is provided in which a monomer, a reactive dye, and base are combined under substantially anhydrous reaction conditions to form the polymerizable monomer-dye compound, wherein the monomer comprises a pendant reactive group that covalently links to the reactive dye to form the monomer-dye compound.

14 Claims, 1 Drawing Sheet

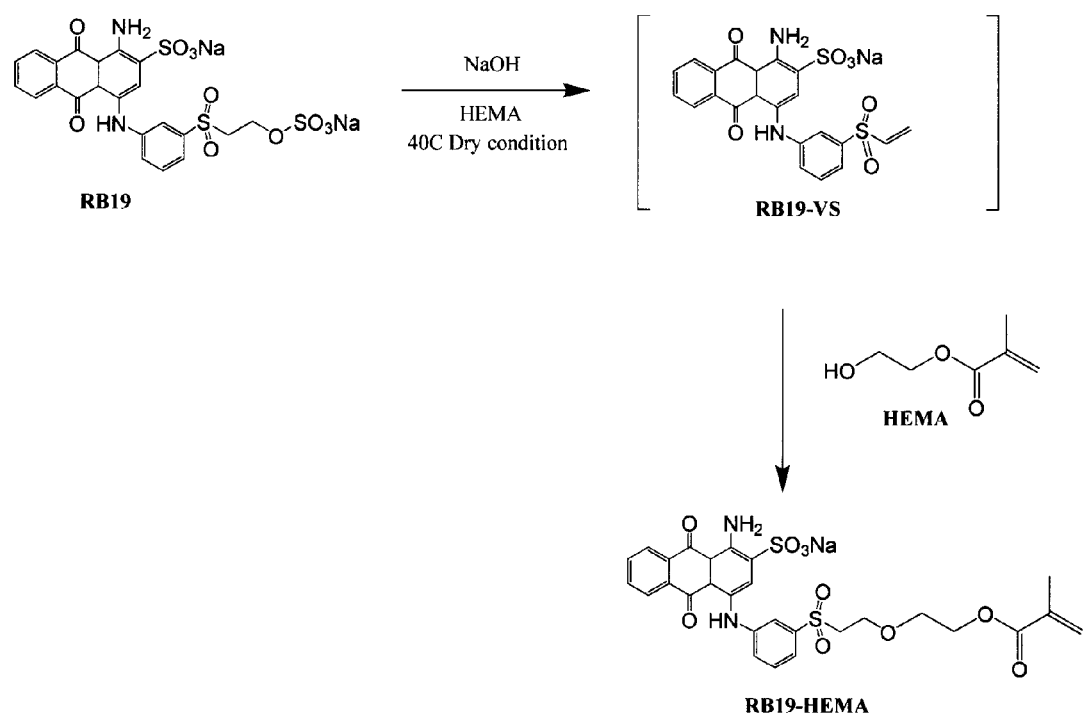

REACTIVE DYES FOR CONTACT LENSES

This application is a National Stage Application of PCT/US2012/047014, filed Jul. 17, 2012, and which claims the benefit under 35 U.S.C. §119(e) of U.S. Provisional Patent Application No. 61/509,388, filed Jul. 19, 2011, which is incorporated in its entirety by reference herein.

BACKGROUND

The field of the invention is reactive dyes for contact lenses.

The colorants used to manufacture tinted soft contact lenses can often leach out and the lenses lose their original tint when subjected to sterilization conditions or during prolonged storage. There is a need for a suitable tinting agent that can sustain the process requirements of contact lens manufacture. Additionally, the purity levels seen in commercially available colorants are normally very low, the use of which imparts a large amount of undesired salts or impurities to the contact lens formulation. For example, the dye content of a commonly available reactive dye, Reactive Blue 19 (RB19), is below 50% and salts such as sodium sulphate and other organic species make up the rest of the material. The presence of extraneous materials in the dye, in turn, affects the polymerization kinetics and overall yield.

Disclosed herein are methods of making highly pure reactive dyes that can be incorporated into polymerizable compositions without impurities that can negatively impact kinetics and overall polymerization. Background publications include U.S. Pat Nos. 4,468,229, 4,559,059, 5,470,932, 5,944,853, 6,149,692, 7,216,975, and 7,659,325.

SUMMARY

Provided herein is a method for preparing a polymerizable monomer-dye compound. The method comprises preparing a reaction mixture by combining a monomer, a reactive dye, and base under substantially anhydrous reaction conditions to form a reaction product comprising the monomer-dye compound, wherein the monomer comprises a pendant reactive group that covalently links to the dye during the reaction to form the polymerizable monomer-dye compound.

Examples of monomers for use in the above method include acrylate-containing monomers, such as hydroxyethyl methacrylate, Si—O-containing monomers, and monomers that comprise a polymerizable group such as a vinyl ether, vinyl ester, allyl ester, or a vinyl amide polymerizable group. Examples of pendant reactive groups of the monomer include a hydroxyl group, an amino group, or a sulfhydryl group.

The reactive dye used in the above method may comprise a sulphatoethylsulphonyl group, a halotriazine group, or a vinyl group, that reacts with the pendant reactive group of the monomer to form the covalent linkage between the monomer and the dye. Exemplary reactive dyes that may be used in the method include RB19, RB4 or RB69.

Exemplary bases that may be used in the above method include NaOH, or K2CO3, or NaH, or $NaNH_2$, or any combination thereof.

In one method, the reactive dye is RB19, the base is NaH or NaOH, and the monomer is HEMA in a molar amount that is at least 5 times that of the reactive dye.

In one method, the monomer and the reactive dye may be added to the reaction mixture at a molar ratio of from about 1:1 to about 6:1, respectively, or about 2:1 to about 4:1, respectively.

The reactive dye and the base may be added to the reaction mixture at a molar ratio of from about 1:2 to about 4:1, respectively, or about 1:1 to about 2:1, respectively.

In one method, the monomer and the reactive dye are added to the reaction mixture at a molar ratio of from about 1:1 to about 6:1, respectively; and the reactive dye and the base are added to the reaction mixture at a molar ratio of from about 1:2 to about 4:1, respectively.

In one method, the reactive dye and base are mixed together in the reaction mixture until at least 90%, or 98% of the reactive dye is converted into an intermediate product before adding the monomer to the reaction mixture. In a specific method, RB19 and NaH are mixed together until at least 90% of the RB19 is converted to an intermediate and then HEMA is added to the reaction mixture.

In one method, the reactive dye and base are mixed together at a molar ratio of from about 1:1 to about 6:1, respectively until at least 90% of the reactive dye is converted into an intermediate product before adding the monomer to the reaction mixture.

In one method, the reactive dye and NaH or $NaNH_2$ or any combination thereof are mixed together at a molar ratio of from about 1:2 to about 4:1 dye:base and reacted under anhydrous conditions until at least 90% of the reactive dye is converted into an intermediate product. Then the monomer is added to the reaction mixture at a molar ratio of monomer to reactive dye of from about 1:1 to about 6:1, respectively.

In one method, a reactive dye comprising a sulphatoethylsulphonyl group and NaH or $NaNH_2$ or any combination thereof are mixed together at a molar ratio of from about 1:2 to about 4:1 dye:base and reacted under anhydrous conditions until at least 90% of the reactive dye is converted into an intermediate product. Then the monomer is added to the reaction mixture at a molar ratio of monomer to reactive dye of from about 1:1 to about 6:1, respectively.

In one method, the RB19 and NaH or $NaNH_2$ or any combination thereof are mixed together at a molar ratio of from about 1:2 to about 4:1 dye:base and reacted under anhydrous conditions until at least 90% of the RB19 is converted into an intermediate product. Then hydroxyethyl methacrylate (HEMA) is added to the reaction mixture at a molar ratio of HEMA to RB19 of from about 1:1 to about 6:1, respectively.

In any of the foregoing methods the reaction mixture may be mixed at a temperature of about 15-45° C., about 20-30° C., or at room temperature; and the reaction may be carried out for about 1 to about 6 hours, or about 2-5 hours.

Any of the foregoing methods may further comprise purifying the reaction product to obtain a monomer-dye compound purity level of at least 90%. In one example, the purifying comprises mixing the reaction product with silica gel and running the reaction product and silica gel mixture through a silica gel column.

Also provided herein are a polymerizable monomer-dye compound prepared by any of the foregoing methods, a contact lens comprising the polymerizable dye compound, and a method of manufacturing a contact lens comprising polymerizing a polymerizable formulation comprising the polymerizable monomer-dye compound to form a contact lens.

BRIEF DESCRIPTION OF THE FIGURE

FIG. 1 depicts a reaction scheme for making a polymerizable monomer-dye compound in accordance with the present disclosure.

DETAILED DESCRIPTION

We have discovered an improved method of making a polymerizable reactive dye for use in contact lens formulations in which a reactive dye is reacted with a monomer under substantially anhydrous conditions in the presence of a base. The reaction product comprises a monomer-dye conjugate which can be easily purified into a highly pure final product suitable for incorporating into polymerizable contact lens formulations.

The monomer used in the method comprises a (i.e. one or more) pendant reactive group that is capable of reacting with the reactive dye to form a covalent linkage between the monomer and dye. Suitable pendant reactive groups include hydroxyl, thiol, or amino groups which, in the presence of the base, covalently link to a reactive group of the reactive dye to form an ether, thioether, or amino linkage, respectively, between the monomer and the dye. As used herein, the term "monomer" refers to any molecule capable of reacting with other molecules that are the same or different, to form a polymer or copolymer. Thus, the term encompasses polymerizable pre-polymers and macromers, there being no size-constraint of the monomer unless indicated otherwise. The monomer comprises one or more polymerizable moieties such that after formation of the monomer-dye compound, at least one polymerizable moiety remains for incorporating the monomer-dye compound into a polymer. Typically the monomer is mono-functional, meaning that it comprises just one polymerizable moiety. However, multi-functional, e.g. bi- and tri-functional, monomers may also be used, in which case, the resulting monomer-dye compound can function as a cross-linking agent in a polymerizable formulation.

In one example, the monomer is an acrylate-containing monomer, meaning that it comprises a polymerizable acrylate functional group (e.g. methyl methacrylate, acrylate, etc.) In one example, the acrylate monomer has a polymerizable methacrylate group. Numerous suitable acrylate monomers comprising one or more pendant hydroxyl, thiol, or amino reactive groups are known. Exemplary acrylate monomers include methacrylic acid, acrylic acid, 2-hydroxybutyl methacrylate (HOB), 2-hydroxyethyl acrylate, glycerol methacrylate, glycerol dimethacrylate, 2-hydroxyethyl methacrylate (HEMA), 2-hydroxylpropyl acrylate, 3-hydroxypropyl, 4-hydroxybutyl acrylate, N-hydroxyethyl methacrylamide, N,N-Bis(2-hydroxyethyl)methacrylamide, 2-aminoethyl methacrylate, N-(3-aminopropyl) methacrylamide, N-(2-aminoethyl) methacrylamide, and 2-mercaptoethyl methacrylate.

Other suitable monomers that can be used comprise a polymerizable vinyl group such as a vinyl ether, vinyl ester, allyl ester, or a vinyl amide polymerizable group. Examples of such monomers include 1,4-butanediol vinyl ether (BVE), ethylene glycol vinyl ether (EGVE), and diethylene glycol vinyl ether (DEGVE).

In other examples, the monomer comprises an Si—O group, referred to herein as a Si—O-containing monomer. Examples of Si—O-containing monomers that may be used include MCS-MC12 (Gelest, Morrisville, Pa.), 3-methacryloxy-2-hydroxypropyloxy)propylbis(trimethylsiloxy)methylsilane (SiGMA), methacryloxy 2-hydroxypropyltris-(trimethylsiloxy)silane (TRIS-OH), polydimethyl siloxane (PDMS) silanol, and 3'-Tris(trimethylsiloxy)silylproplyl-3-(2-hydroxyethyl)carbonyl butenoate.

Reactive dyes that may be used in the method are well-known in the field. In one example, the reactive dye comprises a reactive group this is a sulphatoethylsulphonyl group, a halotriazine group, or a vinyl group. Exemplary dyes include Remazol Black B, and Reactive Blue dyes such as Reactive Blue 19 (RB19), Reactive Blue 4 (RB4), and Reactive Blue 69 (RB69). Other suitable reactive dyes include Reactive Blue140, Reactive Blue 163, Reactive Blue 109, Reactive Yellow 86, Reactive Yellow 22, Reactive Yellow 7, Reactive Orange 4, Reactive Red 11, Reactive Red 1, Reactive Red 2, Reactive Red 6, and Procion Black MX-CWA. Frequently, commercially available reactive dyes are less than 90% or 80% pure. The reactive dye may be used as-is, or may be purified before use in the method. Exemplary purification methods are described in Example 1. In one method, the reactive dye is purified using methanol. This can be done by mixing the dye with methanol, at about 1:5 parts to about 1:50 parts, respectively, for at least 1 hour, and filtering and drying the dye. The reactive dye may be purified to achieve a purity of at least 85%, 90%, or 95%, as determined by peak area of an HPLC read-out. In a specific method, the reactive dye is RB19 that is at least 85%, 90%, or 95% pure. Throughout this disclosure, when a series of values is presented with a qualifier preceding the first value, the qualifier is intended to implicitly precede each value in the series unless context indicates otherwise. For example, in the above-mentioned purity levels it is intended that the qualifier "at least" implicitly precedes the values of 90% and 95%.

Any base that is capable of acting as a catalyst in the reaction to result in covalent linkage between the dye and monomer can be used. Examples of suitable bases include NaH, NaNH$_2$, NaOH, and K$_2$CO$_3$. In one examples the base is a sodium salt (e.g. NaH, NaNH$_2$, NaOH, etc.). In another example a base is used that results in formation of a reaction product that is essentially free of in situ-formed water. Examples of such bases include NaH and NaNH$_2$. As used herein, a reaction product that is essentially free of in situ-formed water comprises less than 0.5% in situ formed water. When a base is used that results in in situ formation of water, a drying agent, such as anhydrous Na$_2$SO$_4$, may be added to the reaction to keep reaction conditions substantially anhydrous. By substantially anhydrous reaction condition, it is meant that the reaction mixture comprises less than 2% water, or less than 1%, or 0.5% water. In a specific example, the reactive dye is RB19, the monomer is HEMA, and the base is NaH.

In one example, the reactive dye is mixed with the base to form an intermediate product prior to adding the monomer to the reaction mixture. The percent conversion of the reactive dye to the intermediate product can be monitored by thin layer chromatography (TLC). In one example, monomer is added to the reaction mixture after at least about 90%, 95%, 98%, or 99% of the reactive dye has converted to the intermediate product (as determined by TLC or other appropriate chromatographic method). For example, in Reaction 12 described in Example 2 below, RB19 was mixed with solvent, then a strong base was added which caused conversion of RB19 to an intermediate product, believed to be RB19-vinyl sulfone. The reaction was followed by thin layer chromatography (TLC) until all of the RB19 was completely converted to the intermediate product. Then, the monomer (HEMA) was added. The final reaction product of Reaction 12 comprised about 70% RB19-HEMA after solvent evaporation and prior to any work-up or column purification.

In one example, the monomer is added to the reaction mixture in a molar amount that is at least 5×, 10×, 15× or 20× that of the reactive dye. In a specific example, the reactive dye is RB19, the base is NaH, and the monomer is HEMA added in a molar amount of at least 5 times that of RB19. In other examples, the monomer is added to the reaction mixture at a molar ratio of monomer to reactive dye of from about 1:1 to about 6:1, respectively, or from about 2:1 to about 4:1, respectively. Additionally, or alternatively, the molar ratio of reactive dye to base in the reaction mixture is from about 1:4 to about 4:1, respectively, or from about 1:2 to about 4:1, respectively, or from about 1:1 to about 3:1, respectively, and in one example about 1:1 to about 2:1, respectively.

In one example, at least 95%, 98%, or 99% of the reactive dye is converted to an intermediate product in the presence of the base, then the monomer is added to the reaction mixture at a molar ratio of monomer to reactive dye of from about 1:1 to about 6:1, respectively, or from about 2:1 to about 4:1, respectively.

The reactants may be mixed together at any temperature that allows the desired reaction to occur. In one example, the reaction occurs at about 15-45° C., or about 20-30° C., or at room temperature, wherein temperature is based on the temperature of the immediate environment in which the reaction occurs (and not the actual temperature of the reaction mixture). The reaction is usually completed within about 1-6 hours or about 2-5 hours. In various examples, the reaction product comprises at least 50%, 55%, 60%, 70%, or 75% monomer-dye compound prior to any post reaction work-up or purification.

After the reaction is complete, the reaction product may be purified using any suitable method or combination of purification methods to increase the purity of the monomer-dye compound to at least 90%, 95%, 97%, 98% or 99%. Exemplary purification methods are described below in Examples 3-6. In one example, the reaction product is mixed with silica gel, and then passed through a silica gel chromatography column.

The monomer-dye compound is suitable for use as a colorant of polymerized medical devices, including ophthalmic devices such as silicone hydrogel contact lenses or traditional HEMA-based hydrogel contact lenses. The monomer-dye compound can be directly added to a polymerizable composition comprising at least one additional polymerizable monomer, which is then polymerized so that the monomer-dye becomes an integral part of the resulting polymer, imparting color to it. The monomer-dye is typically added to a polymerizable formulation in an amount of about 0.001 wt. %. to about 0.5 wt. %, relative to the weight of all polymerizable ingredients in the formulation. For silicone hydrogel contact lens formulations, the monomer-dye may be added to the formulation in an amount of about 0.005 wt. % to about 0.05 wt. %. Examples of polymerizable formulations for silicone hydrogel contact lenses are described in U.S. Pat. Nos. 7,750,079 and 7,572,841, incorporated herein by reference. The tints used in the formulations described in these patents may be replaced by the monomer-dyes described herein. Thus, provided herein is a method of making a contact lens comprising: (i) preparing a polymerizable formulation comprising a monomer-dye compound prepared as described herein and at least one additional polymerizable monomer; and (ii) polymerizing the polymerizable formulation to form a contact lens. In a specific example, the monomer-dye is RB19-HEMA, and the at least one additional polymerizable monomer is a Si—O-containing monomer.

As is evident from the disclosure of the application as a whole, including the claim structure and the specific examples, the exemplary components of the method of preparing a polymerizable monomer-dye compound disclosed herein are typically combined in embodiments of the invention. For example, the person skilled in the art would recognize that the method of preparing a polymerizable monomer-dye compound of the invention advantageously includes the exemplary monomers disclosed herein in combination with the exemplary reactive dyes disclosed herein in combination with the exemplary bases disclosed herein.

Thus, the exemplary acrylate monomers, vinyl group-containing monomers, or Si—O group-containing monomers disclosed in the above paragraphs are, advantageously, combined in the method of the invention in combination with any of the reactive dyes disclosed above. For example, HEMA, or EGVE, or SiGMA may be combined with any one of the reactive dyes disclosed above, especially RB19, or RB4, or RB69.

Advantageously, the exemplary monomers disclosed in the above paragraphs are combined with any of the exemplary bases disclosed in the above paragraphs. For example, the exemplary acrylate monomers, vinyl group-containing monomers, or Si—O group-containing monomer disclosed in the above paragraphs may be used in combination with any one or more of the bases disclosed above, especially in combination with NaH or NaOH.

Similarly, the exemplary reactive dyes disclosed in the above paragraphs may be combined with any of the exemplary bases disclosed in the above paragraphs. For example, RB19, or RB4, or RB69 may be combined with any one or more of the bases disclosed above, especially in combination with NaH or NaOH.

Furthermore, the exemplary monomers disclosed in any of the above paragraphs are, advantageously, combined in the method with any of the reactive dyes disclosed above and any of the bases disclosed above. Thus, the method of the invention may optionally include a combination of HEMA, or EGVE, or SIGMA, together with both (i) RB19 or RB4 or RB69 and (ii) a base such as NaH or NaOH.

Further, it will be appreciated that these components can be combined in any of the relative molar ratios described in the above examples. Thus, for example, the method of the invention may optionally include a combination of HEMA, or EGVE, or SiGMA, together with both (i) RB19 or RB4 or RB69 and (ii) a base such as NaH or NaOH, wherein the monomer and the reactive dye are combined at a molar ratio of from about 1:1 to about 6:1, respectively, and/or the reactive dye and the base are combined at a molar ratio of from about 1:2 to about 4:1, respectively.

As demonstrated above and by the specific examples, it has been found that combinations of the preferred monomers, reactive dyes, and/or bases of the invention provide a monomer-dye with advantageous properties for use in methods of manufacturing contact lenses.

The following Examples illustrate certain aspects and advantages of the present invention, which should be understood not to be limited thereby. Unless otherwise stated, any % amounts provided herein are based on total weight. Further the term or phrase "a" or "an" is meant to encompass "one or more" such as two, three, four or more.

Example 1

Purification of Reactive Blue 19

RB19 was purified using methods A-C described below.

Method A: 10 g RB19 (Sigma-Aldrich) having a purity of approximately 78% (HPLC at 254 nm) was dissolved in 50 ml DI water. 1 liter of THF was added to the RB19 solution and mixed well with stirring for 30 minutes. The mixture was filtered and the obtained solid was mixed with 50 ml methanol, and then precipitated with 500 ml ether. The mixture was filtered and washed with ether and dried to get approximately 8.0 g of blue powder. HPLC analysis showed a purity of 92.5%.

Method B: 10 g RB19 (Sigma-Aldrich) having a purity of approximately 78% (HPLC at 254 nm) was dissolved in 100ml methanol with stirring at room temperature for 30 minutes. 400 ml of ethyl acetate was added to the RB19 solution and mixed well with stirring for 30 minutes. The mixture was filtered and the obtained solid was further washed with 40 ml tetrahydrofuran and dried to get approximately 9.0 g of blue powder. HPLC analysis showed a purity of 90.7%.

Method C: 70 g of commercial RB19 (with dye content of ~50% and a purity of 84%) was purified by stirring with 20× the volume of methanol for 4 hours, filtered, and thoroughly dried under vacuum for 18 hours. The purified RB19 (50 g) was obtained in 71% yield with a purity of 96%.

Example 2

Synthesis of RB19-HEMA Using Anhydrous Conditions and Strong Base

For each of reactions 1-11 summarized in Table 1, a round bottom flask was pre-dried at >110° C. HEMA was pre-dried with a 3 A molecular sieve at 170° C. To each flask, under nitrogen, were added RB19, 4-methoxyphenol (MEHQ), dried HEMA and anhydrous NaOH or $K_2CO_3$. In some reactions (i.e. 3, 6, and 7) $NaSO_4$ was added as a drying agent. The reaction mixtures were stirred under nitrogen in a 40° C. oil bath. For reactions 1-6, approximately 50-60% of the RB19 formed an undesired product, RB19-OH (as determined using HPLC at 585 nm) and approximately 40-50% formed RB19-HEMA. In reaction 4, which had the lowest reaction time (30 min.) there was a peak comprising approximately 1.5% of an intermediate product, RB19-vinyl sulfone (RB19-VS).

For reaction 12 of Table 1, 50 g purified dry RB19 was placed in a 1 L 3-necked round bottom flask. 180 ml DMF was added and the mixture was stirred for 30 minutes. The NaH was added in portions of 100-200 mg with stirring at room temperature for 1 hour. The reaction was followed by thin layer chromatography (TLC) using 10% methanol in dichloromethane. Additional NaH was added in 50 mg portions until all of the RB19 was completely converted to an intermediate, RB19-VS (presumed). Next, 29 ml HEMA was added dropwise at room temperature into the mixture using an addition funnel. The resulting mixture was stirred at room temperature until the TLC showed the complete disappearance of the intermediate (typically 3-4 hours). The mixture was then transferred to a 1 L round bottom flask and placed at 70° C. under high vacuum to remove most of the DMF solvent.

conditions tested. Unreacted HEMA and other impurities can be removed from the reaction product to obtain RB19-HEMA of high purity using one or more methods described in Examples 3-6.

Example 3

Purification of RB19-HEMA by Precipitation and Column Chromatography

For 1 g scale of RB19 reaction, 50 ml THF was added to the reaction product and stirred for 10 minutes. Then 50 ml hexane was added and stirred another 10 minutes. The mixture was sealed and refrigerated for 2 hr. The mixture was then filtered, and the obtained solid was loaded onto a silica gel column for purification. This method effectively removed most of the unreacted HEMA in the mixture. Another precipitating solvent, such as ether, could also be used to remove HEMA.

Example 4

Purification of RB19-HEMA by Ethyl Acetate/Aqueous Washing

About 10×EtOAc, relative to the volume of HEMA used in the reaction, was added to the reaction product. The mixture was transferred into a separation funnel and washed with a saturated NaCl solution. During washing, most of the presumed RB19-OH precipitated on the wall of the separation funnel. The washed EtOAc phase was dried over sodium sulfate. After removing all solvent by rotary evaporator and drying the product under vacuum, a dark slurry of crude RB19-HEMA was obtained. In addition to RB19-HEMA, the slurry contained unreacted HEMA and an unknown impurity (showing at 254 nm from HPLC). Ethyl ether or THF/Hexane (3:7) at four times the HEMA volume was added to the slurry to precipitate a solid tint. The solid was filtered and rinsed with a small amount of ethyl ether or THF/Hexane. This wash removed the unreacted HEMA and impurity.

Example 5

Purification of RB19-HEMA by Column Chromatography

The reaction product from reaction 11 in Example 2 above was directly loaded onto an 80 g silica gel column. Eluent was

TABLE 1

| | RB19 (% purity) | HEMA | DMF | Base | MEHQ | $Na_2SO_4$ | Temp | Time (min) |
|---|---|---|---|---|---|---|---|---|
| 1 | 1.0 g (78%) | 10 ml | — | 0.1 g NaOH | 0.03 g | — | 40° C. | 120 |
| 2 | 1.0 g (78%) | 10 ml | — | 0.1 g NaOH | 0.03 g | — | 40° C. | 60 |
| 3 | 1.0 g (78%) | 10 ml | — | 0.1 g NaOH | 0.03 g | 0.5 g | 40° C. | 45 |
| 4 | 1.0 g (93%) | 10 ml | — | 0.1 g NaOH | 0.01 g | — | 40° C. | 30 |
| 5 | 1.0 g (93%) | 10 ml | — | 0.1 g NaOH | 0.03 g | — | 40° C. | 120 |
| 6 | 5.0 g (93%) | 40 ml | — | 0.5 g NaOH | 0.02 g | 4.0 g | 40° C. | 45 |
| 7 | 10.0 g (78%) | 60 ml | — | 1.0 g NaOH | 0.1 g | 2.0 g | 40° C. | 60 |
| 8 | 1.0 g (78%) | 20 ml | — | 0.5 g $K_2CO_3$ | 0.2 g | — | 40° C. | 120 |
| 9 | 0.5 g (78%) | 10 ml | — | 0.25 g $K_2CO_3$ | 0.1 g | — | 40° C./RT* | 120/45* |
| 10 | 0.5 g (78%) | 10 ml | — | 0.25 g $K_2CO_3$ | 0.1 g | — | 40° C. | 130 |
| 11 | 1.0 g (93%) | 10 ml | — | 0.1 g NaOH | 0.01 g | — | 40° C. | 120 |
| 12 | 50 g (96%) | 29 ml | 180 ml | 1.9 g NaH | — | — | RT | ~240 |

*In reaction 9 after 120 min. at 40° C. the reaction continued an additional 45 min at room temperature.

In the above reactions, sodium sulfate was used as a drying agent. MEHQ was used to inhibit potential polymerization of HEMA; no HEMA polymerization was detected in any of the run from 0 to 15% MeOH in $CH_2Cl_2$ or $CHCl_3$. The crude reaction product contained about 35% RB19-HEMA, 51% RB19-OH (presumed) and HEMA solvent. After column purification, 0.133 g of RB19-HEMA having 98% purity (HPLC 254 nm and 585 nm) was obtained.

Example 6

Purification of RB19-HEMA by Column Chromatography and Precipitation

The crude reaction product of reaction 12 of Example 2 was mixed with 50 g of silica gel. The mixture was transferred to the top of a chromatography column packed with 400 g of silica gel in 1 L of DCM. The column was eluted with 6% methanol in DCM (9 L total). As the blue product eluted, it was collected in 40 ml fractions for a total of 4 liters. Each fraction was checked by TLC. Fractions containing RB19-HEMA were combined and concentrated to yield about 8.5 g of blue product. The column-purified product was stirred in 100 ml of ether-ethyl acetate-hexane (8:1:1) mixture for 18 hours; this step was repeated until the filtered product had acceptable purity as determined by NMR and HPLC. 8.2 g final product was obtained having 95.6% RB19-HEMA as determined by HPLC.

Applicants specifically incorporate the entire contents of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. A method for preparing a polymerizable monomer-dye compound, comprising:
combining a monomer, a reactive dye, and base under substantially anhydrous reaction conditions to form a reaction product comprising the monomer-dye compound, wherein the monomer comprises a pendant reactive group that covalently links to the reactive dye during the reaction to form the polymerizable monomer-dye compound, wherein the pendant reactive group is a hydroxyl group, an amino group, or a sulthydryl group that forms an ether linkage, amino linkage, or thioether linkage, respectively, between the monomer and the dye.

2. The method of claim 1, wherein the monomer is hydroxyethyl methacrylate.

3. The method of claim 1, wherein the monomer is an Si—O-containing monomer.

4. The method of claim 1, wherein the monomer and the reactive dye are in the reaction mixture at a molar ratio of from about 1:1 to about 6:1, respectively.

5. The method of claim 1, wherein the monomer is present in a molar amount that is at least 5 times that of the reactive dye.

6. The method of claim 1, wherein the reactive dye comprises a sulphatoethylsulphonyl group, a halotriazine group, or a vinyl group, that reacts with the pendant reactive group of the monomer to form the covalent linkage between the monomer and the dye.

7. The method of claim 1, wherein the reactive dye is RB19, RB4 or RB69.

8. The method of claim 1, wherein the reactive dye is RB19 at a purity of at least 90%.

9. The method of claim 1, wherein the base is NaOH, or K2CO3, or NaH, or NaNH2, or any combination thereof.

10. The method of claim 1, wherein the monomer is HEMA, the reactive dye is RB19, and the base is NaH.

11. The method of claim 10, wherein the RB19 and NaH are mixed together and at least 90% of the RB19 is converted into an intermediate product before the HEMA is added to the reaction mixture.

12. The method of claim 1, wherein the reaction mixture is mixed at a temperature of about 15-45° C.

13. The method of claim 1, wherein the reaction mixture is mixed at a temperature of about 20-30° C.

14. The method of claim 1, wherein the reaction lasts for about 1 to about 6 hours.

* * * * *

UNITED STATES PATENT AND TRADEMARK OFFICE
CERTIFICATE OF CORRECTION

| | | |
|---|---|---|
| PATENT NO. | : 8,865,929 B2 | Page 1 of 1 |
| APPLICATION NO. | : 14/131915 | |
| DATED | : October 21, 2014 | |
| INVENTOR(S) | : Xu et al. | |

It is certified that error appears in the above-identified patent and that said Letters Patent is hereby corrected as shown below:

IN THE CLAIMS:

Claim 1, column 10, line 11, "sulthydryl" should read --sulfhydryl--.

Signed and Sealed this
Thirteenth Day of January, 2015

Michelle K. Lee
*Deputy Director of the United States Patent and Trademark Office*